US009290182B2

(12) United States Patent
Dlugoss et al.

(10) Patent No.: US 9,290,182 B2
(45) Date of Patent: Mar. 22, 2016

(54) GARAGE SHIFT CONTROL OF A BINARY CLUTCH ASSEMBLY

(71) Applicant: GM GLOBAL TECHNOLOGY OPERATIONS LLC, Detroit, MI (US)

(72) Inventors: Randall B. Dlugoss, Royal Oak, MI (US); John E. Marano, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 112 days.

(21) Appl. No.: 13/664,461

(22) Filed: Oct. 31, 2012

(65) Prior Publication Data
US 2014/0121906 A1    May 1, 2014

(51) Int. Cl.
| | |
|---|---|
| *B60W 10/11* | (2012.01) |
| *B60W 10/18* | (2012.01) |
| *B60W 30/18* | (2012.01) |
| *B60W 10/115* | (2012.01) |
| *B60W 10/184* | (2012.01) |
| *F16H 61/02* | (2006.01) |
| *F16H 61/68* | (2006.01) |

(52) U.S. Cl.
CPC ....... *B60W 30/18036* (2013.01); *B60W 10/115* (2013.01); *B60W 10/184* (2013.01); *F16H 61/0246* (2013.01); *B60W 2520/10* (2013.01); *B60W 2540/16* (2013.01); *B60W 2710/1094* (2013.01); *B60W 2720/10* (2013.01); *F16H 61/68* (2013.01)

(58) Field of Classification Search
CPC ... F16H 61/686; F16H 61/0204; F16H 3/666; F16H 57/08; F16H 2200/0052; F16H 2200/201; F16H 2200/2043
USPC .......................................................... 475/153
See application file for complete search history.

(56) References Cited

U.S. PATENT DOCUMENTS

| | | | | |
|---|---|---|---|---|
| 5,612,874 | A * | 3/1997 | Schulz | F16H 61/0021 477/163 |
| 5,646,842 | A * | 7/1997 | Schulz | F16H 61/0206 475/127 |
| 6,126,566 | A * | 10/2000 | Kerr | B62M 11/04 475/173 |
| 7,198,587 | B2 * | 4/2007 | Samie | F16H 3/666 192/43.1 |
| 8,029,403 | B2 * | 10/2011 | Lee | F16H 3/66 475/271 |

(Continued)

FOREIGN PATENT DOCUMENTS

| | | |
|---|---|---|
| CN | 102574521 B | 7/2012 |
| JP | 2007225048 A * | 9/2007 |
| JP | 2010007794 A * | 1/2010 |

*Primary Examiner* — John R Olszewski
*Assistant Examiner* — Jean-Paul Cass
(74) *Attorney, Agent, or Firm* — Quinn Law Group, PLLC

(57) ABSTRACT

A vehicle includes an internal combustion engine, brake actuators configured to slow the vehicle in response to braking commands, and a transmission. The transmission includes a plurality of gear sets each having a plurality of nodes, an input member that is continuously connected to the engine and to a node of one of the gear sets, a reverse clutch, a binary clutch assembly, and a controller. The binary clutch assembly is connected at least to the same gear set as the input member, and is applied with the reverse clutch when entering a reverse gear state. The controller executes a method to transmit the braking commands to the brake actuators in response to a requested garage shift into a reverse gear state when the vehicle is rolling above a calibrated speed threshold, and thereby slows the vehicle until a calibrated target slip is achieved across the binary clutch assembly.

16 Claims, 2 Drawing Sheets

(56) References Cited

U.S. PATENT DOCUMENTS

| | | | | |
|---|---|---|---|---|
| 8,182,390 B2* | 5/2012 | Sah | ............... | B60K 6/365 477/3 |
| 8,494,738 B2* | 7/2013 | Lee | ............... | F16H 61/686 475/43 |
| 8,630,777 B2* | 1/2014 | Phillips | ............... | B60W 30/18027 477/62 |
| 2003/0119623 A1* | 6/2003 | Stevenson | ............... | F16H 3/66 475/275 |
| 2004/0235608 A1* | 11/2004 | Borgerson | ............... | F16H 3/66 475/275 |
| 2005/0130789 A1* | 6/2005 | Samie | ............... | F16H 3/666 475/284 |
| 2007/0099754 A1 | 5/2007 | Yamaguchi et al. | | |
| 2007/0099758 A1* | 5/2007 | Maguire | ............... | B60W 10/02 477/175 |
| 2010/0063698 A1* | 3/2010 | Lee | ............... | F16H 61/686 701/67 |
| 2011/0098152 A1* | 4/2011 | Sah | ............... | B60K 6/365 477/86 |
| 2012/0165146 A1 | 6/2012 | Samie et al. | | |
| 2012/0283922 A1* | 11/2012 | Phillips | ............... | B60W 30/18027 701/66 |

* cited by examiner

GARAGE SHIFT CONTROL OF A BINARY CLUTCH ASSEMBLY

TECHNICAL FIELD

The disclosure relates to the garage shift control of a binary clutch assembly.

BACKGROUND

A motor vehicle transmission typically uses interconnected gear elements and clutches to couple rotatable transmission input and output members, and to thereby establish a desired transmission speed ratio. Clutches may be configured as fluid-actuated devices having a series of spaced friction plates. A hydraulic piston is actuated so as to compress the friction plates together and thereby transfer torque across the engaged clutch, or to stop rotation of a side of the clutch and any interconnected gear elements or nodes. Plate clutches are typically controlled with a variable rate of slip, such that the state of the clutch can range from fully-applied to fully-released to anywhere in between.

In some transmissions, a binary clutch assembly having, e.g., a selectable one-way clutch, a freewheeling element, and/or a dog clutch, is used alone or in conjunction with the rotating and/or braking plate clutches noted above to establish one or more gear states. Unlike conventional plate clutches, a binary clutch assembly has just two possible states: fully-applied and fully-released. When applied, the binary clutch assembly is prevented from rotating in both rotational directions. When released, the binary clutch assembly freewheels in one rotational direction, and thus one side of the binary clutch may effectively slip with respect to the other side.

SUMMARY

A vehicle is disclosed herein that includes a transmission having a binary clutch assembly and a set of brake actuators, the latter of which may be controlled via anti-lock braking system (ABS) logic. The transmission includes one or more gear sets, at least one node of which is connected to the binary clutch assembly. A controller automatically detects a requested garage shift of the transmission. As used herein, the term "garage shift" means any manually requested or automatically commanded shift of the transmission into a reverse gear state. The controller determines whether the vehicle is rolling at a speed that is above a low threshold speed when such a request is made. If so, the controller activates the brake actuators to slow the vehicle at a defined rate to below the threshold speed, and then commands an application of the binary clutch assembly, e.g., via execution of the ABS logic. Brake application in this manner is intended to simulate the feel of an actively-engaging reverse clutch, i.e., a conventional friction plate clutch, while delaying the engagement of the reverse clutch.

Central to the present approach is automatic slip control over the binary clutch assembly prior to execution of the requested garage shift. Application of the binary clutch assembly and the subsequent or concurrent engagement of the reverse clutch are delayed whenever the garage shift is requested above the threshold speed. This is intended to help minimize the impact of an early engagement on the binary clutch assembly. At the same time, automatic brake control at a defined rate simulates the feel of an immediate engagement of the reverse clutch while also minimizing any noise, vibration, and harshness experienced by a driver during execution of the requested apply of the binary clutch assembly and the subsequent shift into reverse.

In particular, a vehicle is disclosed herein that includes an internal combustion engine, a set of brake actuators configured to slow the vehicle in response to a braking command, and a transmission having a controller. The transmission includes a plurality of gear sets each having a plurality of nodes, and an input member that is continuously connected to the engine and to a node of one of the gear sets. The transmission also includes a reverse clutch, i.e., a conventional rotating friction plate clutch, that selectively connects the input member to another node of one of the gear sets. A binary clutch assembly of the transmission is connected at least to the same gear set as the input member, and is applied when entering a reverse gear state.

The controller is in communication with the engine, the reverse clutch, and the binary clutch assembly, and includes a processor. The controller is operable to transmit braking commands to the set of brake actuators, via the processor, in response to a requested garage shift into a reverse gear state when the vehicle is travelling at a rate of speed above a calibrated threshold to thereby slow the vehicle at a defined rate until a calibrated target slip is achieved across the binary clutch assembly.

A method is also disclosed that includes detecting in a vehicle, via a controller, a requested shift of the transmission noted above to a reverse gear state while the vehicle is rolling above a threshold speed. The method also includes transmitting braking commands to the set of brake actuators in response to a requested garage shift into a reverse gear state, and slowing the vehicle at a defined rate via the brake actuators until a calibrated target slip is achieved across the binary clutch assembly. The method proceeds by applying the binary clutch assembly via the controller and engaging the reverse clutch to thereby shift the transmission into the reverse gear state.

The transmission in one embodiment includes first, second, and third gear sets each having multiple nodes, an input member, a reverse clutch, a binary clutch assembly, and a controller. The input member is selectively connected to the first gear set and continuously connected to the second gear set, and also receives input torque from the engine. The reverse clutch selectively connects the input member to a node of the first gear set. The binary clutch assembly is connected at least to the same gear set as the input member, and is selectively applied when the transmission is shifted to a reverse gear state.

In this embodiment, the controller communicates with the engine, the reverse clutch, and the binary clutch assembly, includes a processor, and is operable to transmit a set of braking commands to a set of brake actuators in response to a requested garage shift into the reverse gear state when the vehicle is rolling at a rate of speed above a calibrated threshold speed. The controller continues transmitting the braking commands until a calibrated target slip is achieved across the binary clutch assembly. Thereafter, the controller transmits a clutch control signal to the binary clutch assembly and the reverse clutch to thereby shift the transmission into the reverse gear state only after the calibrated target slip is achieved across the binary clutch assembly.

The above features and the advantages of the present disclosure are readily apparent from the following detailed description of the best modes for carrying out the invention when taken in connection with the accompanying drawings.

DETAILED DESCRIPTION

Figure 1:
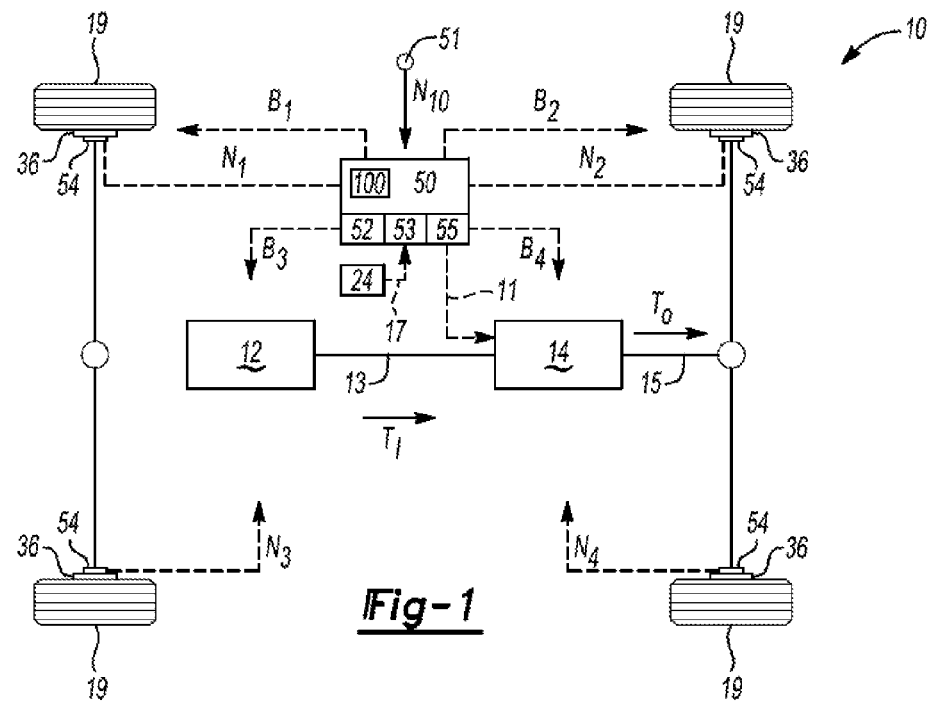
FIG. 1 is a schematic illustration of an example vehicle having an automatic transmission and a controller which controls a state of a binary clutch assembly of the transmission during a garage shift as set forth herein.

Referring to the drawings, wherein like reference numbers reference to similar components in the various Figures, an example vehicle 10 is shown schematically in FIG. 1. The vehicle 10 includes an internal combustion engine 12 or other prime mover, an automatic transmission 14, and a controller 50. The controller 50 is configured to control a garage shift of the transmission 14, i.e., a shift of the transmission 14 into reverse from stop or from a forward rolling state. Such a maneuver that is typically but not necessarily executed while backing the vehicle 10 out of a garage, although any reverse shift may be controlled using the present approach.

Figure 4:
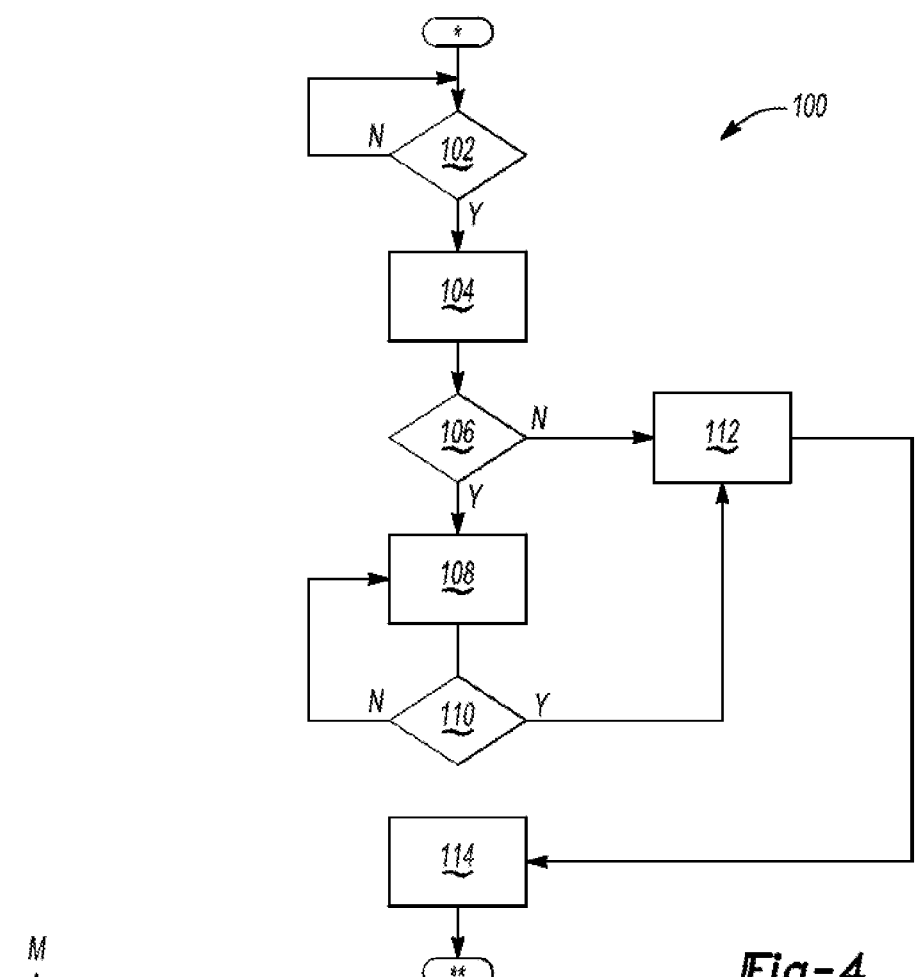
FIG. 4 is a flow chart describing an example method for shifting the transmission of FIG. 2 into reverse in response to a requested garage shift.

The controller 50 executes instructions or logic embodying a method 100, an example of which is shown in FIG. 4 and described below with additional reference to FIG. 3. The controller 50 executes the method 100 to precisely time an application of the binary clutch assembly of FIG. 2 via a clutch command (arrow 11), and to thus minimize the impact of forces acting on a binary clutch assembly 25, particularly during a rolling garage shift. Such a binary clutch assembly 25 is described below with reference to FIG. 2. Relative to conventional methods, execution of the present method 100 may help reduce the level of noise, vibration, and harshness in the vehicle 10 during execution of the shift into reverse.

The engine 12 of the vehicle 10 shown in FIG. 1 may be coupled to the transmission 14 via a hydrodynamic torque converter assembly (not shown), or via another torque transfer mechanism such as an input clutch. An input member 13 of the transmission 14 receives input torque (arrow $T_I$) from the engine 12. The transmission 14 ultimately delivers output torque (arrow $T_O$) via an output member 15 to some or all of the wheels 19 in a two-wheel, a four-wheel, or an all-wheel drive configuration.

The vehicle 10 also includes a set of brake actuators 36 responsive to a set of braking commands (arrows $B_1$, $B_2$, $B_3$, $B_4$) from the controller 50. The brake actuators 36 are controlled as needed to apply friction brake pads, drums, and/or any other suitable combination of friction and electronic braking components in order to slow the vehicle 10 at a defined rate. The controller 50, which is in communication with the transmission 14 and with each of the brake actuators 36, is programmed with or has access to anti-lock braking system (ABS) logic 52.

In a possible embodiment, the controller 50 may receive individual wheel speeds (arrows $N_1$, $N_2$, $N_3$, $N_4$) from a set of speed sensors 54, and thus can calculate the rate of slip between each of the wheels 19 and a road surface. The controller 50 automatically activates the ABS logic 52 when needed to rapidly cycle the brake actuators 36 via braking commands (arrows $B_1$-$B_4$) and thereby prevent the wheels 15 from locking, as is well known in the art.

The controller 50 of FIG. 1 also selectively activates the ABS logic 52 when needed during a rolling garage shift above a low threshold speed. Application of the brake actuators 36 via the ABS logic 52 reduces vehicle speed at a defined rate prior to applying the binary clutch assembly 25 described herein, e.g., with reference to FIG. 2. Therefore, the controller 50 may be in communication with a park, reverse, neutral, drive, low (PRNDL) valve 24 such that the controller 50 receives, either directly or via an engine control module (not shown), a PRNDL setting (arrow 17). Using the sensors 54 or other sensors, the controller 50 also determines a vehicle speed (arrow $N_{10}$) which is used in the execution of method 100 as set forth below.

Structurally, the controller 50 may include at least one processor 53 along with tangible, non-transitory memory 55, e.g., read-only memory (ROM), flash memory, optical memory, additional magnetic memory, etc. The controller 50 may also include random access memory (RAM), electrically programmable read only memory (EPROM), a high-speed clock, analog-to-digital (A/D) and/or digital-to-analog (D/A) circuitry, and any input/output circuitry or devices, as well as any appropriate signal conditioning and buffer circuitry. Instructions for executing the method 100 for controlling slip across the binary clutch assembly 25 are recorded in the memory 55 and executed via the processor(s) 53.

Figure 2:
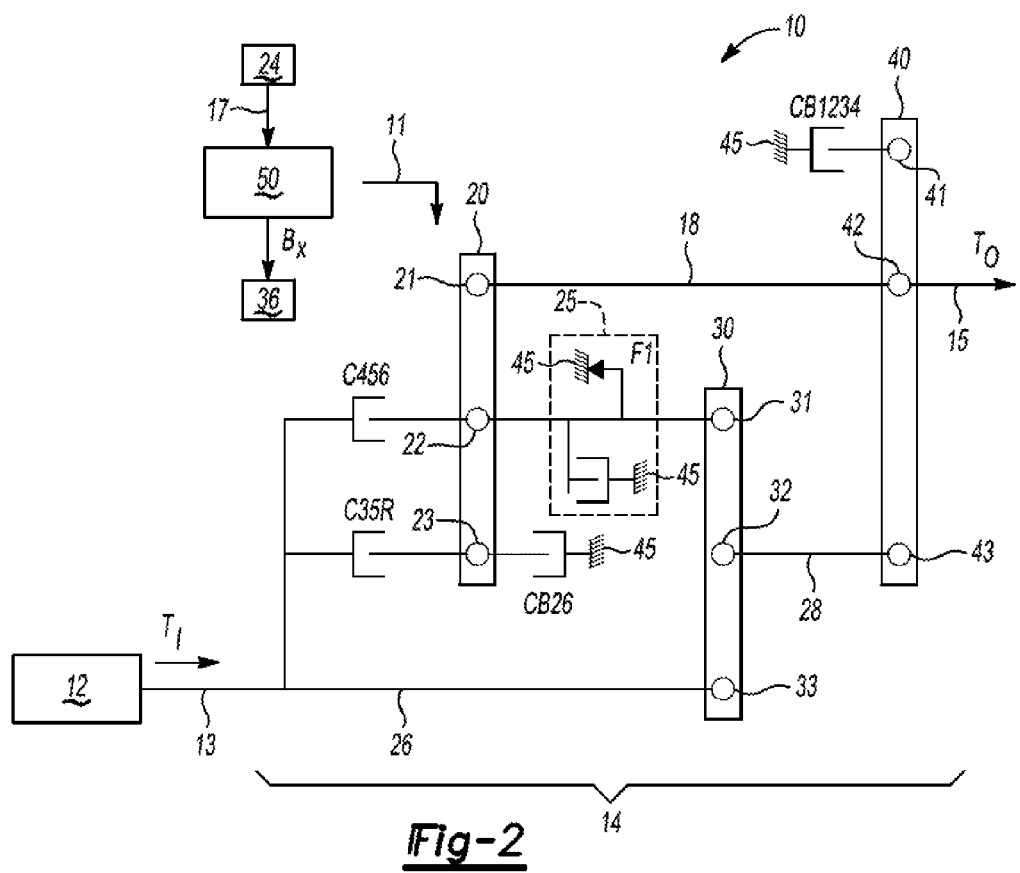
FIG. 2 is a schematic illustration of an example embodiment of the transmission of FIG. 1.

Referring to FIG. 2, an example embodiment of the transmission 14 of FIG. 1 is shown as a schematic lever diagram, as will be well understood by those having ordinary skill in the art. At least one node of the transmission 14 is connected to the binary clutch assembly 25, e.g., a selectable one-way clutch, a freewheeling element such as element F1, a dog clutch, or any other clutch device having only the binary states of fully-applied/engaged and fully-released as noted above.

As noted above, the controller 50 detects a requested garage shift of the transmission 14. Such a garage shift requires application of the binary clutch assembly 25 in conjunction with one or more reverse clutches. However, the binary clutch assembly 25 cannot always be applied immediately upon request. For instance, slip across the binary clutch assembly 25 may be too high at the moment the garage shift is requested, or vehicle speed may be too high, such that an immediate application of the binary clutch assembly 25 could impact the binary clutch assembly 25 and/or render the garage shift unacceptably harsh. The controller 50 addresses this particular control problem via execution of instructions embodying the method 100, including the selective activation of the ABS logic 52 shown in FIG. 1. Selective use of the ABS logic 52 of FIG. 1 thus simulates the expected plate clutch feel of an immediate shift into reverse.

In the example configuration shown in FIG. 2, the transmission 14 may include first, second, and third gear sets 20, 30, and 40, respectively. The first gear set 20 may include respective first, second, and third nodes 21, 22, and 23. The second and third gear sets 30 and 40 may likewise have respective first, second, and third nodes. For the second gear set 30, the first, second, and third nodes are nodes 31, 32, and 33, respectively. The third gear set 40 includes respective first, second, and third nodes 41, 42, and 43.

With respect to the first gear set 20, the first node 21 is continuously connected to the second node 42 of the third gear set 40 via an interconnecting member 18. The second node 22 is selectively connected to the engine 12 and the input member 13 via a first rotating clutch C456. Likewise, the third node 23 is selectively connected to the engine 12 and the input member 13 via a second rotating clutch C35R. The third node 23 is selectively connected to a stationary member 45 of the transmission via a first braking clutch CB26.

As used herein for all clutches, the letter "C" refers to "clutch", "B" refers to "brake", and the various numbers refer to the particular forward drive gear modes, e.g., "R" is reverse, "1" is $1^{st}$ gear, "2" represents $2^{nd}$ gear, etc., all the way up to $6^{th}$ gear. The absence of a "B" in the clutch designation indicates that the particular clutch is a rotating clutch. Therefore, clutch C35R acts as a reverse clutch in the embodiment of FIG. 2, and is required to engage when shifting the transmission 14 into reverse during a garage shift.

In the second gear set 30 of FIG. 2, the first node 31 is selectively connected to the second node 22 of the first gear set 20 via the binary clutch assembly 25. Engagement of the binary clutch assembly 25 locks the nodes 22 and 31 to the stationary member 45 of the transmission 14. The second node 32 is continuously connected to the third node 43 of the third gear set 40 via another interconnecting member 28. The third node 33 is continuously connected to the input member 13 directly or via yet another interconnecting member 26. The first node 41 of the third gear set 40 is selectively connected to the stationary member 45 via a second braking clutch CB1234. The second node 42 is continuously connected to the output member 15 of the transmission 14, with the output member 15 carrying output torque (arrow $T_O$) as noted above.

The controller 50 shown schematically in FIG. 2, as noted above, may be embodied as any digital computer device or multiple such devices in communication with the engine 12 and with the PRNDL valve 24. The controller 50 thus receives the PRNDL setting (arrow 17) and selectively transmits the clutch control signals (arrow 11) to apply the binary clutch assembly 25 as needed, as well as the reverse clutch, in this instance clutch C35R.

After transmitting the clutch control signals (arrow 11), the controller 50 waits until the slip across the binary clutch assembly 25 reaches a threshold low slip, e.g., 0 RPM±5 RPM or as close to zero as possible before applying the binary clutch assembly 25. Braking commands (arrow $B_X$), which collectively represents the brake commands (arrows $B_1$-$B_4$) shown in FIG. 1, are ultimately transmitted via the controller 50 to the brake actuators 36, only one of which is shown for simplicity in FIG. 2. The target slip may be determined as being present when a target vehicle speed is achieved, as will now be explained with reference to FIGS. 3 and 4.

Figure 3:
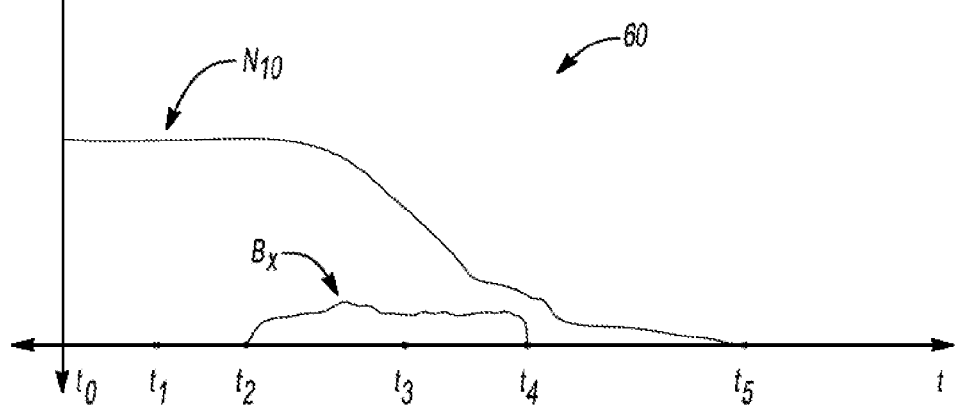
FIG. 3 is a set of traces describing vehicle parameters controlled in the execution of the present method.

Referring to FIG. 3, a set of traces 60 illustrates two vehicle control parameters used in the control of the binary clutch assembly 25 of FIG. 2 during execution of a requested garage shift. The first parameter is vehicle speed, which is represented as trace $N_{10}$. The second parameter is the braking command(s) (trace $B_X$), which may be embodied as four different braking commands, i.e., one for each of the wheels 19 shown in FIG. 1. The horizontal axis represents time (t), while the vertical axis represents magnitude (M).

At $t_0$, the vehicle 10 of FIG. 1 is rolling at a low rate of speed. At about $t_1$, the driver may request a shift into reverse while the vehicle 10 is still rolling, typically by moving a PRNDL lever into reverse (R). Because vehicle speed (trace $N_{10}$) is still relatively high, the binary clutch assembly 25 and the reverse clutch, e.g., the clutch C35R of FIG. 2, are not applied immediately in the present approach.

Instead, a short time later at about $t_2$, the controller 50 of FIGS. 1 and 2 transmits the braking commands (trace $B_X$) to the various brake actuators 36 shown in FIG. 1. After the brake actuators 36 respond to the received braking commands (trace $B_X$), the vehicle 10 of FIG. 1 slows at a defined rate, whether calibrated or calculated, as shown between $t_2$ and $t_5$ of FIG. 3. Sometime immediately prior to or concurrent with the vehicle 10 stopping at about $t_5$, the binary clutch assembly 25 of FIG. 2 is applied, such as at $t_3$. The actual moment of apply may be determined in such a manner as to minimize the level of slip occurring across the binary clutch assembly 25 at the moment of application, e.g., 0±5 RPM in one embodiment.

An example approach for controlling the binary clutch assembly 25 of FIG. 2 during a garage shift is described with reference to FIG. 4. Upon initialization (*), the controller 50 executes step 102, wherein a requested garage shift is detected. Step 102 may entail a measurement of the PRNDL valve setting (arrow 17 of FIGS. 1 and 2) or receipt/measurement of any other suitable signal. The controller 50 repeats step 102 in a loop until this condition is detected, and then proceeds to step 104.

At step 104, the controller 50 next detects the present speed of the vehicle 10, such as by measuring the individual wheel speeds via the sensors 54 of FIG. 1, and/or via transmission output speed sensor 51, by calculation, or using other suitable means. The method 100 proceeds to step 106 once the vehicle speed has been determined.

At step 106, the controller 50 determines whether the vehicle 10 is rolling at a speed that is above a calibrated threshold speed when the garage shift to reverse is requested. If so, the method 100 proceeds to step 108. Otherwise, the method 100 proceeds to step 112.

Step 108 may entail activating the ABS logic 52 shown schematically in FIG. 1. As a result, the brake actuators 36 of FIG. 1 receive the braking commands (arrows $B_{1-4}$ of FIG. 1) and, as a result, are commanded to apply the brakes, at a defined rate, e.g., a calibrated or calculated rate, to slow the wheels 19. The method 100 then proceeds to step 110.

At step 110, the controller 50 determines whether slip across the binary clutch assembly 25 of FIG. 2 is at or below a threshold, i.e., a calibrated target slip. Step 110 may include, in an example embodiment, monitoring the vehicle speed (trace $N_{10}$ of FIG. 3) to determine when this value has dropped below a low calibrated speed threshold. Such a threshold could be determined offline as a calibration value by measuring or calculating the level of slip across the binary clutch assembly 25 for a range of possible vehicle speeds. Alternatively, the slip across the binary clutch 25 may be calculated in real time. As will be well understood by those of ordinary skill in the art, in a multi-gearset transmission such as the example transmission 14 of FIG. 2, knowledge of the speed of any three nodes of the transmission 14 allows the controller 50 to determine the speed of any other node. If the slip across the binary clutch assembly 25 is below the calibrated threshold, the method 100 proceeds to step 112. Otherwise, step 108 is repeated.

At step 112, the controller 50 transmits the clutch control signals (arrow 11 of FIGS. 1 and 2) and thereby applies the binary clutch assembly 25 of FIG. 2. Step 112 may also include applying the reverse clutch, which is clutch C35R in the example embodiment shown in FIG. 2, either concurrently with application of the binary clutch assembly 25 or shortly thereafter. The method 100 then proceeds to step 114.

At step 114, the controller 50 may turn off the ABS logic 52 of FIG. 1. Engagement of the reverse clutch at step 112 allows turbine speed to pull down, and thus the vehicle will continue to slow as the transmission 14 reverses the direction of output torque (arrow $T_O$ of FIGS. 1 and 2) in response to the shift into reverse. This effect is shown in FIG. 3 between $t_4$ and $t_5$. After $t_5$, the vehicle 10 of FIG. 1 may again begin to pick up speed in response to a requested output torque from a driver, e.g., depression of an accelerator pedal (not shown). The operation of the transmission 14 is thereafter controlled via existing control algorithms.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   an internal combustion engine;
   a set of wheels;
   a set of brake actuators configured to slow the vehicle via braking of the set of wheels in response to braking commands; and
   a transmission having:
      a plurality of gear sets each having a plurality of nodes;
      an input member that is continuously connected to the engine and to a node of one of the gear sets;
      an output member that delivers an output torque of the transmission to the set of wheels;
      a reverse clutch selectively connecting the input member to another node of one of the gear sets;
      a binary clutch assembly that is connected at least to the same gear set as the input member, and that is applied with the reverse clutch when the transmission is shifted to a reverse gear state; and
      a controller in communication with the engine, the reverse clutch, and the binary clutch assembly, wherein the controller includes anti-lock braking system (ABS) logic and a processor, and is operable to:
         transmit the braking commands to the set of brake actuators by activating the ABS logic in response to a requested garage shift into the reverse gear state when the vehicle is rolling at a rate of speed above a calibrated threshold;
         continue to transmit the braking commands to thereby slow the vehicle, automatically via control of the set of brake actuators, at a defined rate until a calibrated target slip is achieved across the binary clutch assembly; and
         command an application of the binary clutch assembly when the calibrated target slip is achieved.

2. The vehicle of claim 1, further comprising a park, reverse, neutral, drive, low (PRNDL) valve, wherein the controller is in communication with the PRNDL valve and is configured to detect the requested garage shift by processing, via the processor, a signal from the PRNDL valve.

3. The vehicle of claim 1, wherein the controller is further configured to continuously calculate a level of slip across the binary clutch assembly while transmitting the braking commands, and to apply the binary clutch assembly only when the calculated slip is below the calibrated target slip.

4. The vehicle of claim 1, wherein the controller is configured to transmit a clutch control signal to the reverse clutch after applying the binary clutch assembly to thereby engage the reverse clutch.

5. The vehicle of claim 1, wherein the transmission includes a first and a second gear set, and wherein the binary clutch assembly is connected between nodes of the first and second gear sets.

6. The vehicle of claim 5, wherein the transmission includes a pair of rotating clutches each selectively connecting the engine to different nodes of the first gear set, and wherein one of the rotating clutches is the reverse clutch.

7. The vehicle of claim 1, wherein the binary clutch assembly includes one of a selectable one-way clutch, a freewheeling element, and a dog clutch.

8. The vehicle of claim 1, wherein the transmission includes an output speed sensor in communication with the controller, and wherein the controller is operable to determine when the vehicle is rolling above the threshold speed at least in part by processing a speed signal from the output speed sensor.

9. A method comprising:
   detecting in a vehicle having a set of wheels, via a controller, a requested garage shift of a transmission to a reverse gear state while the vehicle is rolling above a threshold speed, wherein the transmission includes a plurality of gear sets each having a plurality of nodes, an input member that is continuously connected to the engine and to one of the gear sets, an output member that delivers an output torque of the transmission to the set of wheels, a reverse clutch, and a binary clutch assembly that is connected to the same gear set as the input member;
   transmitting braking commands to a set of brake actuators by activating recorded anti-lock braking system (ABS) logic of the controller in response to the requested garage shift, wherein the brake actuators are configured to slow the vehicle via braking of the set of wheels;
   automatically slowing the vehicle, via the transmitting of the braking commands to the brake actuators, at a defined rate until a calibrated target slip is achieved across the binary clutch assembly;
   applying the binary clutch assembly via the controller; and
   engaging the reverse clutch after applying the binary clutch assembly to thereby shift the transmission into the reverse gear state.

10. The method of claim 9, wherein applying the binary clutch assembly includes applying a selectable one-way clutch, a freewheeling element, or a dog clutch.

11. The method of claim 9, wherein detecting the requested shift of the transmission to the reverse gear state includes processing, via the controller, a signal from a park, reverse, neutral, drive, low (PRNDL) valve.

12. The method of claim 9, wherein the transmission includes an output speed sensor in communication with the controller, the method further comprising:
   processing a speed signal from the output speed sensor to determine when the vehicle is rolling above the threshold speed.

13. A transmission for a vehicle having an engine, a set of wheels, and a set of brake actuators configured to slow the vehicle via braking of the set of wheels, the transmission comprising:
   first, second, and third gear sets each having multiple nodes;
   an input member that is selectively connected to the first gear set and continuously connected to the second gear set, wherein the input member receives input torque from the engine;
   an output member that delivers an output torque of the transmission to the set of wheels;
   a reverse clutch selectively connecting the input member to a node of the first gear set;
   a binary clutch assembly connected at least to the same gear set as the input member, wherein the binary clutch is selectively applied when the transmission is shifted to a reverse gear state; and
   a controller in communication with the engine, the reverse clutch, and the binary clutch assembly, wherein the controller includes tangible, non-transitory memory on which is recorded anti-lock braking system (ABS) logic, and also includes a processor, and is operable to:
      transmit a set of braking commands to the set of brake actuators by activating the ABS logic in response to a requested garage shift into the reverse gear state when the vehicle is rolling at a rate of speed above a calibrated threshold speed;

continue transmitting the braking commands to slow the vehicle at a defined rate until a calibrated target slip is achieved across the binary clutch assembly; and transmit respective clutch control signals to the binary clutch assembly and the reverse clutch to thereby shift the transmission into the reverse gear state only after the calibrated target slip is achieved across the binary clutch assembly.

14. The transmission of claim 13, wherein the binary clutch assembly is connected to the first and second gear sets.

15. The transmission of claim 13, further comprising a transmission output speed sensor in communication with the controller, and wherein the controller is operable to determine when the vehicle is rolling at a rate of speed above the calibrated threshold speed at least in part by processing a speed signal from the transmission output speed sensor.

16. The transmission of claim 13, further comprising a park, reverse, neutral, drive, low (PRNDL) valve in communication with the controller, wherein the controller is configured to detect the requested garage shift at least in part by processing, via the controller, a signal from the PRNDL valve.

* * * * *